Inventors
Harold N. Seyferth
Gilbert Stewart
BY
Parker, Carlson, Pitzner & Hubbard
Attorneys.

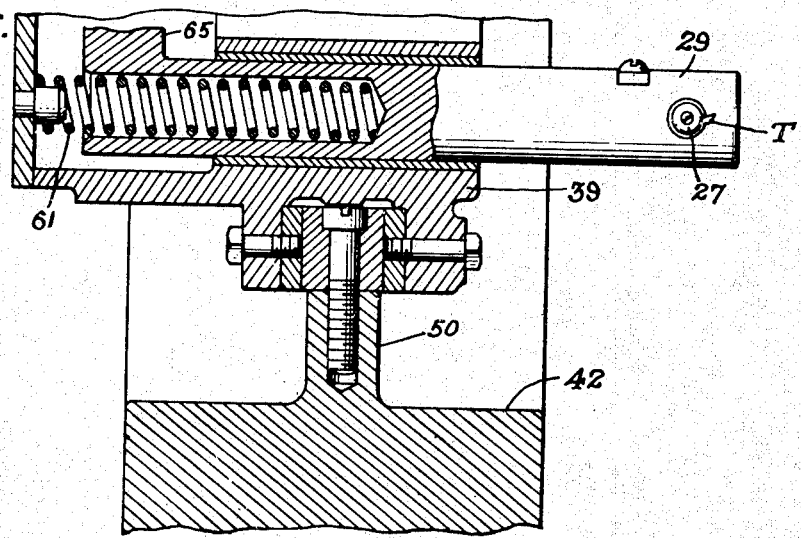
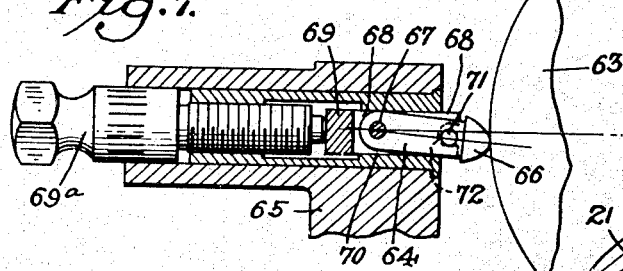
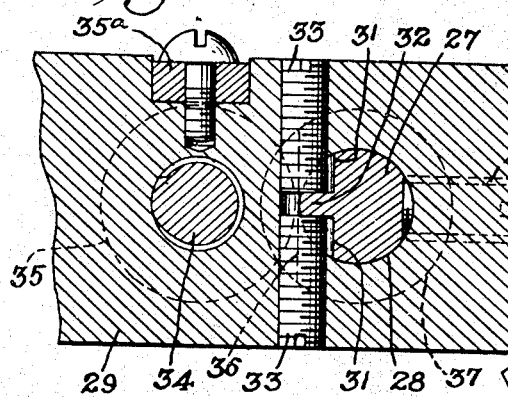
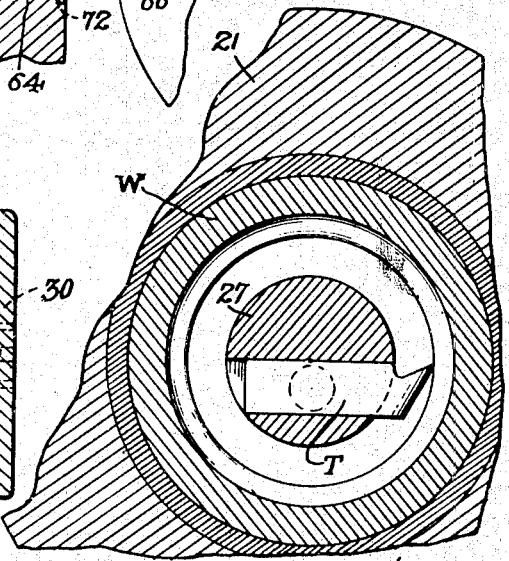

Patented June 3, 1947

2,421,655

UNITED STATES PATENT OFFICE 2,421,655

BORING MACHINE

Harold N. Seyferth, East Detroit, and Gilbert Stewart, Detroit, Mich., assignors to Ex-Cell-O Corporation, Detroit, Mich., a corporation of Michigan Application May 25, 1943, Serial No. 488,374

9 Claims. (Cl. 77—3)

The present invention relates generally to improvements in boring machines, and has particular reference to machines which are adapted for boring internal forms with straight, inclined or irregular contours.

One of the objects of the present invention is to provide a new and improved boring machine having a rotary work spindle and a single-point boring tool, and in which the cutting stroke described between the work and the point of the tool is the resultant of two perpendicular and relatively variable components of translation substantially in a given axial plane of the work.

Another object is to provide a novel machine for irregular contour boring in which the actuating means for imparting said components of translation comprises a cam having a predetermined form of amplified scale and range of movement so as to reduce to a minimum the effect of wear and any error in form resulting in the manufacture of the cam on the contour to be produced in the boring operation, and accordingly to obtain a high degree of accuracy in the form of said contour.

A further object is to provide a new and improved boring machine having a rotary work spindle, and a tool fixture in the form of an attachment for translating a non-rotary single-point cutting tool, and in which screw means is provided for imparting a cutting traverse to the tool axially through the work, and a rotary form cam is operable in timed relation to the screw means for modifying the cutting traverse by imparting predetermined radial movements to the tool in accordance with the desired contour to be produced.

Another object is to provide a boring machine of the foregoing character in which the single point tool is mounted in a boring bar that is longitudinally and rotatably adjustable so as to permit proper location of the cutting point in relation to the work.

A further object is to provide novel tool actuating means which is automatically operable to cause the tool to describe spaced but like paths of movement respectively in opposite directions of translation through the work.

Other objects and advantages will become apparent as the description proceeds.

In the accompanying drawings.

Figure 1:
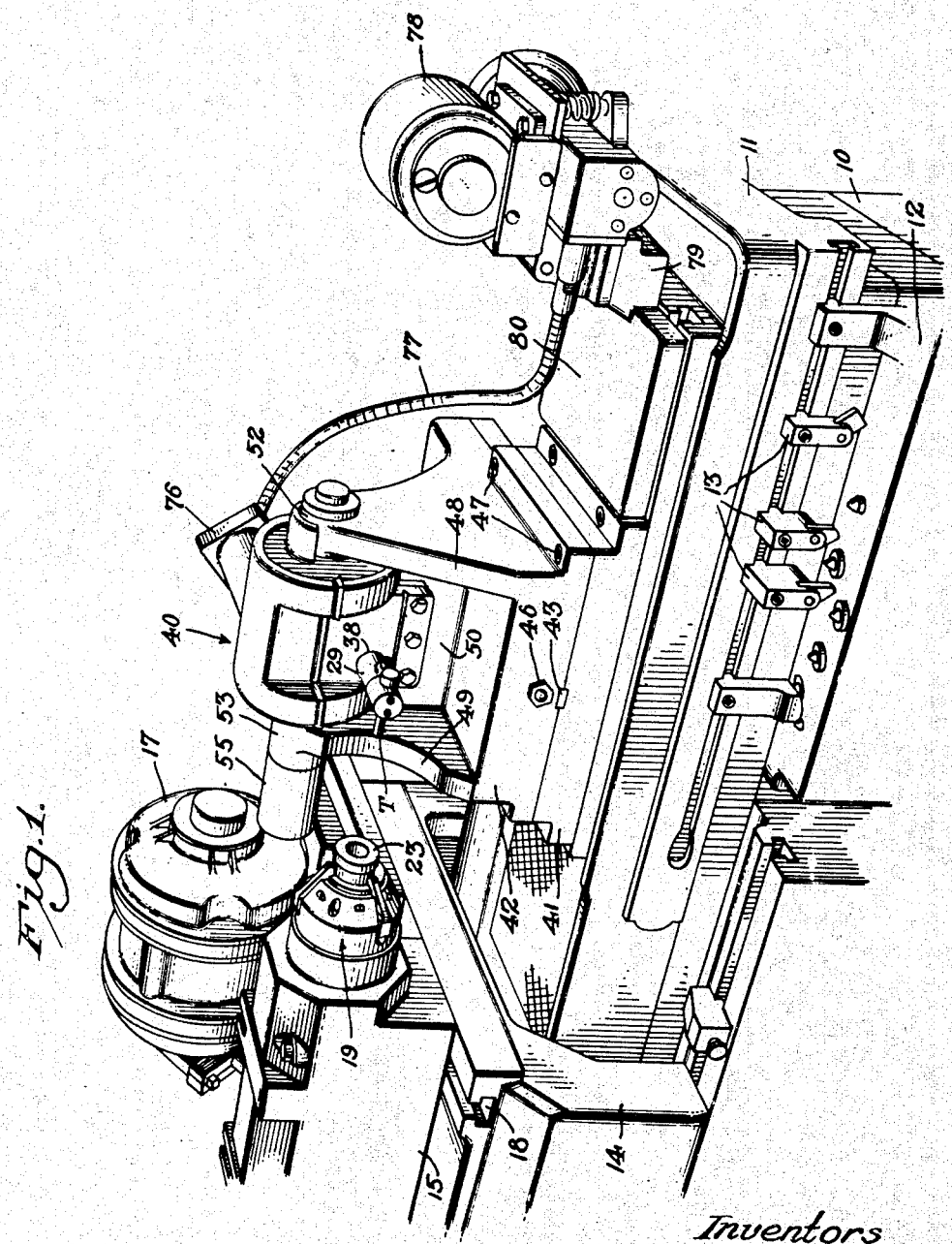
Figure 1 is a fragmentary perspective view of the boring machine embodying the features of our invention.
Figure 2:
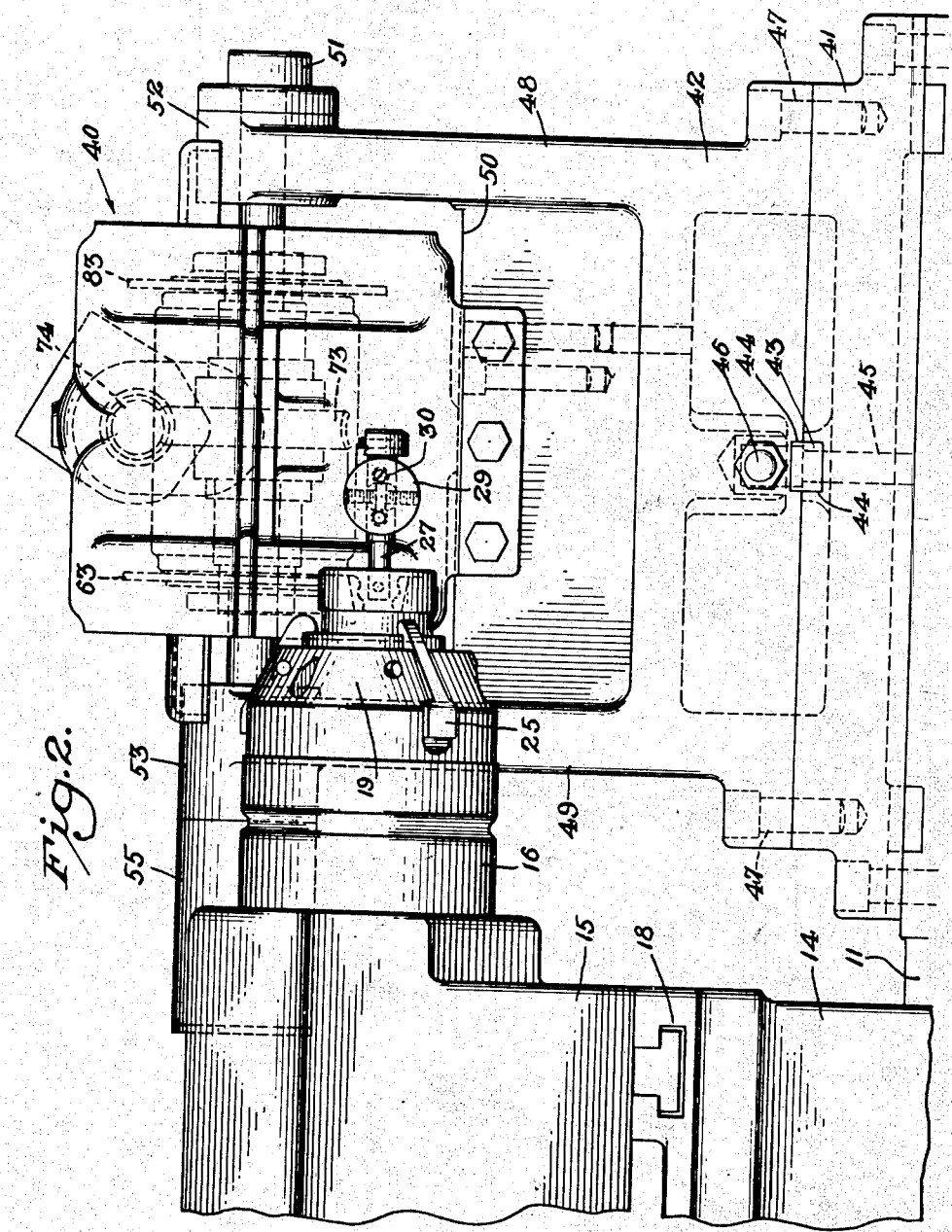
Fig. 2 is a fragmentary front elevational view of the machine.
Figure 3:
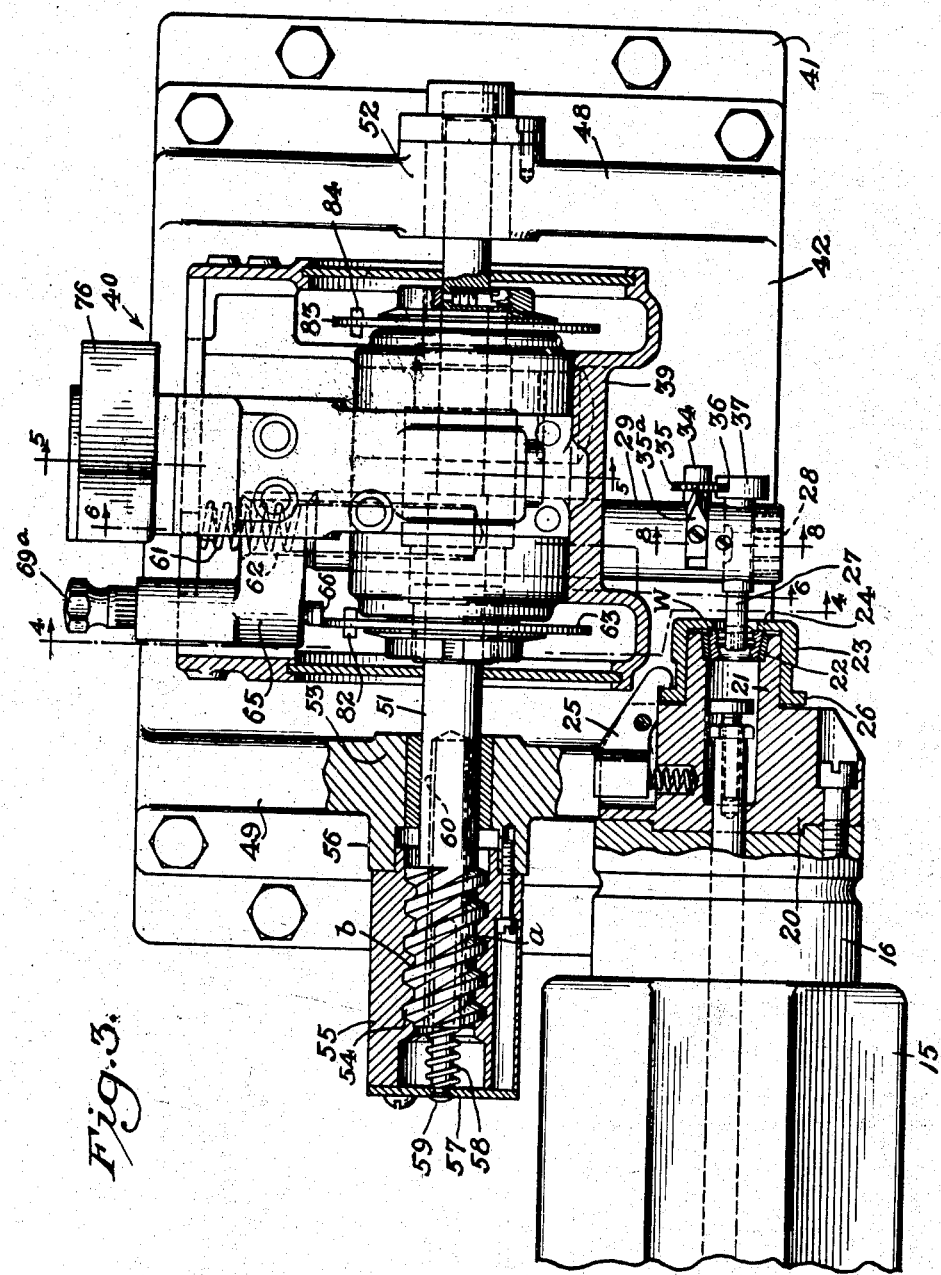
Fig. 3 is a fragmentary plan view of the machine, partially in horizontal section.
Figure 4:
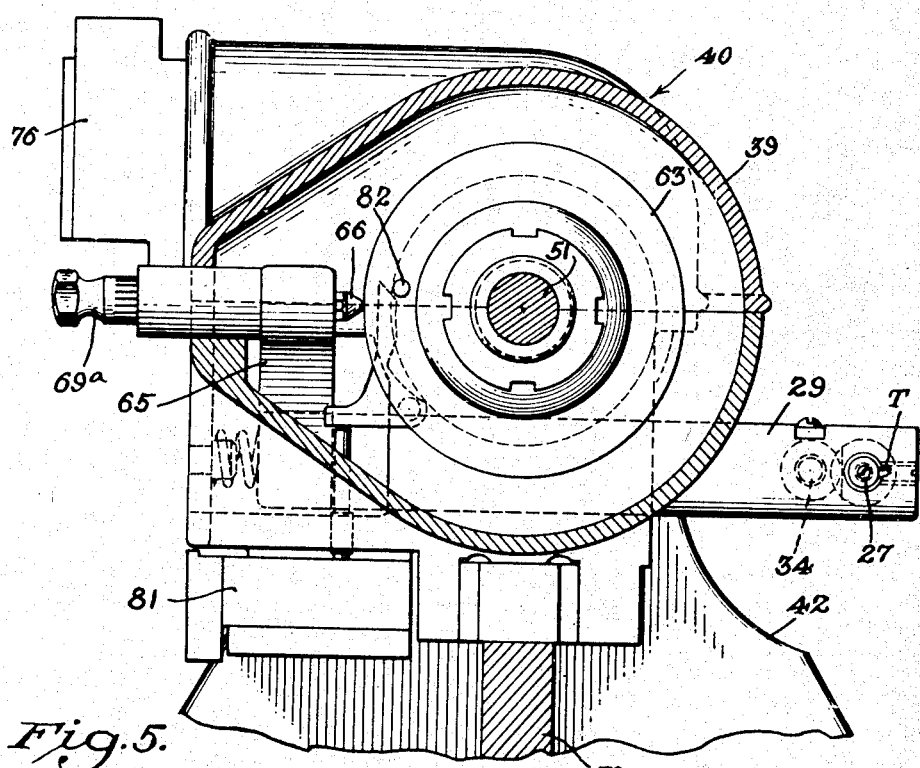
Figure 5:
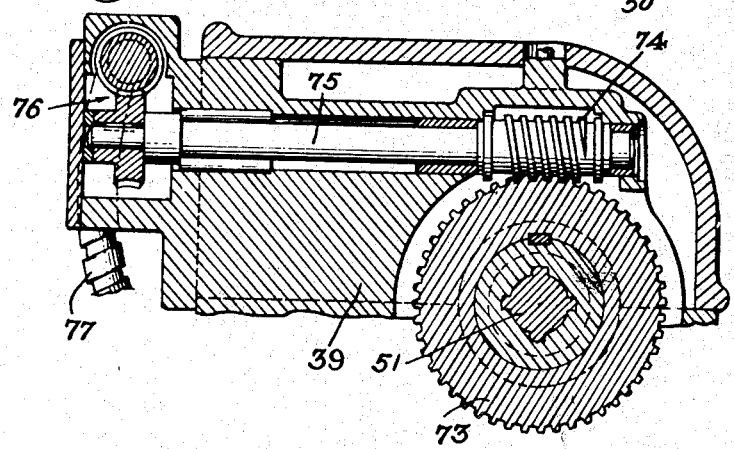

Figs. 4, 5 and 6 are fragmentary transverse vertical sectional views taken substantially along lines 4—4, 5—5 and 6—6 respectively of Fig. 3, through the tool actuating mechanism.

Fig. 7 is a fragmentary sectional detail view of a cam follower forming part of the actuating mechanism for the tool holder.

Fig. 8 is a sectional detail view taken along line 8—8 of Fig. 3, and illustrating means for angularly adjusting the boring bar.

Fig. 9 is a sectional view on an enlarged scale illustrating the boring tool in cutting engagement with the work.

Referring more particularly to the drawings, the boring machine constituting the exemplary embodiment of the invention comprises an elongated base frame 10 supporting a longitudinally translatable table 11. A suitable transmission mechanism is provided for actuating the table 11, but is not disclosed in detail since per se it forms no part of the present invention. The transmission mechanism may be of the hydraulic type, as disclosed in the patent to C. R. Alden No. 2,000,553, and comprising a main valve panel 12, operable either manually for positioning the table 11 or by control dogs 13 on the table for an automatic cycle.

Mounted on one end of the machine frame 10 is an inverted bridge structure 14 which extends crosswise over the table 11, and which supports a suitable spindle structure 15 having a rotary spindle 16. An electric motor 17 on the rear portion of the bridge 14 is connected to drive the spindle 16. The spindle structure 15 is adjustable transversely along T-slots 18 in the bridge 14, and extends longitudinally of the table 11.

Mounted on the forward end of the spindle 16 is a suitable work chuck 19 which in the present instance comprises a body 20 formed with a reduced annular extension 21. A tapered socket 22 is formed in the outer end of the extension to receive a workpiece W. A flanged sleeve 23 is slidably mounted on the outer end extension 21 of the chuck body 20 and has an internal annular flange 24 for securing the workpiece W in the tapered socket 22. The flange 24 is forced into clamping engagement with the outer end of the workpiece W by a plurality of centrifugal fingers 25 acting against an external annular flange 26 on the sleeve 23.

The present invention relates primarily to novel means for traversing a single-point boring tool T through the workpiece W in a predetermined cutting path which may be straight, inclined or irregular so as to provide different contours. In the present instance, the tool T is removably mounted in and projects laterally from the free end of a boring bar 27 extending longitudinally of the work axis. The supported end of the bar 27 extends rotatably through a transverse bore 28 in the forward end of a tool holder 29, and is adapted to be clamped in position within said bore by means of set screws 30.

To provide means for rotatably adjusting the boring bar 27 so as to locate the cutting point of the tool T in proper angular relation to the work, the bar is formed in one side with spaced notches 31 defining an intermediate longitudinal rib 32. Two set screws 33 are threaded from diametrically opposite points through the holder 29 into the bore 28 for engagement at their inner ends with opposite sides of the rib 32. By loosening one of the screws 33 and by tightening the other, the tool bar 27 may be rotatably adjusted.

Longitudinal adjustment of the boring bar 27 to locate the point of the tool T in proper relation to the work along the axis of rotation is obtained by means of an adjusting screw 34 threaded into one side of the holder 29 in parallel relation to the bar. The outer end of the adjusting screw 34 is provided with a graduated peripheral flange 35 which extends at one side into a notch 36 in the side of a head 37 on the outer end of the boring bar 27. Consequently, as the screw 34 is rotated, the boring bar 27 is constrained to move axially therewith. A suitable pointer 35a is secured to the tool holder 29 in cooperative relation to the graduated flange 35 so as to indicate the degree of adjustment.

The tool holder 29 consists of a cylindrical bar or rod which extends transversely of the spindle axis, and which is longitudinally translatable in a guide bore 38 formed in a supporting carrier slide 39 constituting part of a tool fixture 40 on the table 11. The tool fixture 40 comprises suitable means for shifting the carrier slide 39 and with it the tool holder 29 longitudinally of the spindle axis to traverse the tool T in a cutting stroke and return stroke through the workpiece W, and also comprises means for actuating the tool holder in the carrier slide in order to shift the tool radially of the spindle axis and thereby modify the resultant cutting path in accordance with the contour to be bored. Thus, the resultant tool translation has two components of movement, one parallel to the spindle axis and the other radially of the spindle axis.

In order to prevent foreshortening of the form produced within the work upon movement of the point or tip of the cutting tool T into different radial positions, and also to present the tool in all positions of translation to the work with the proper top and side relief and face angle, the boring bar 27 is adjusted to locate the tool point in an axial plane through the spindle axis parallel to or coincident with the plane of the component movements of the tool.

The tool fixture 40 comprises a sub-base 41 mounted on one end of the machine table 11 and a main base 42 mounted on the sub-base for adjustment transversely of the spindle axis. The main base 42 is guided for transverse adjustment by two rectangular keys 43 disposed in complemental opposed grooves 44 in the contacting faces of the parts. A fixed post 45 is anchored to the center of the sub-base 41 and extends upwardly into the main base 42. Two adjusting screws 46 are threaded respectively from the front and rear in the main base 42 into engagement at their inner ends with opposite sides of the post 45. By loosening one of the screws 46 and tightening the other, the main base may be adjusted transversely of the work spindle 16 and then clamped in the selected position of adjustment by suitable clamp bolts 47. The adjustment of the main base 42 on the sub-base 41 affords means for effecting a coarse adjustment of the boring tool T radially of the work axis to the required size of the workpiece to be bored.

The base 42 is formed at opposite ends with two spaced upstanding bearing brackets 48 and 49, and with a central longitudinal guide rib 50 extending between the brackets for supporting the carrier slide 39. A main operating shaft 51 is rotatably journaled in and extends through the carrier 39 for translation therewith along the guide rib 50. One end of the shaft is slidably supported in a bearing 52 in the upper end of the bracket 48. The other end of the shaft extends slidably through a bearing 53 in the upper end of the bracket 49, and is formed on its outer end with a lead screw 54 in threaded engagement with the stationary lead nut 55. In the present instance, the nut 55 consists of an internally threaded sleeve which is bolted at one end to an annular flange 56 on the outer side of the bracket 49, and is closed at the other end by a cover plate 57. A coiled compression spring 58, which is seated at its outer end about a guide pin 59 against the cover plate 57 extends into an axial bore 60 in the shaft 51. The spring 58 tends to urge the lead screw 54 to the right in Fig. 3 so as to maintain the thread flanks $a$ and $b$ always in engagement regardless of the direction of rotation so as to eliminate backlash. It will be evident that upon rotation of the shaft 51, the lead screw 54 coacting with the nut 55 will effect translation of the carrier slide 39 and thereby movement of the tool T along the axis of the work spindle 16.

The tool holder 29 is normally urged forwardly by a coiled compression spring 61. This spring seats against the rear wall of the carrier slide 39, and extends into an axial bore 62 in the inner end of the holder 29. A rotary cam 63 is fixed on the shaft 51 for rotation therewith, and has a peripheral cam face of predetermined contour in engagement with a cam follower 64 carried by an arm 65 on the rear end of the tool holder 29. Consequently, the cam 63 determines the position of the holder 29 in timed relation to the translation of the tool T along the work. The shape of the cam is determined by the contour to be bored. For cylindrical boring it would be circular. For taper boring, it would have a uniform spiral face. For contour boring, it would have an irregular form.

The cam follower 64 preferably is constructed to shift the tool holder longitudinally through a short increment of movement in relation to the cam 63 upon each reversal of the operating shaft 51. As a result of such shift, the tool T is caused to describe laterally spaced paths of movement of like form in opposite directions of translation through the work. In the present instance, the cam follower 64 consists of a lever having a hardened tip 66 riding on the cam face. The lever 64 is pivotally mounted at its inner end on a pin 67 within a diametrical slot 68 in the forward end of a supporting block 69 removably fixed within a bore 70 in the arm 65. A transverse pin 71 is carried by the lever 64, and opposite ends of the pin extend loosely into slots 72 formed in opposite sides or bifurcations of the block 69. The slots 72 are so formed that they permit a limited degree of oscillation of the lever 64 in the plane of the cam 63, and are so located that in one limit position of the follower tip 66 the center distance between the cam and lever will be increased to retract the tool T radially toward the spindle axis, and in the other limit position the center distance will be decreased to project the tool radially from the spindle axis. The wiping action of the cam face on the follower tip 66 will cause the lever to oscillate into one limit position or the other depending upon the direction of cam rotation. Thus, upon counter-clockwise rotation of the cam 63 as shown in Fig. 7, the follower tip 66 will be oscillated downwardly to increase the radial projection of the tool T, for example to the required depth of cut during a forward boring stroke into the work. Upon reversal of rotation of the cam 63, the lever will be oscillated upwardly to decrease the radial projection of the tool T, for example to permit withdrawal of the tool from the work in the return stroke without contacting the finished work surface.

The block 69, supporting the follower lever 64, is backed up by an adjusting screw 69a which affords a fine adjustment of the tool T to the required size of the work to be bored.

The operating shaft 51 may be driven reversibly through a predetermined range by any suitable means. In the present instance, a worm wheel 73 is fixed to the shaft 51 within the carrier slide 39, and meshes with a worm 74 on a rearwardly extending drive shaft 75. The drive shaft is connected through gearing 76 to a flexible shaft 77 in turn connected to a reversible electric drive motor 78. The motor is supported on a bracket 79 having a mounting plate 80 removably bolted to the machine table 11 at the right of the tool fixture 40.

A suitable switch mechanism 81 is mounted on the underside of the carrier slide 39 and is operable in timed relation to the rotation of the operating shaft 51 to control the direction and extent of rotation of the motor 78. To this end, the contour cam 63 carries a switch actuating pin 82, and a second cam 83 fixed to the shaft 51 carries a second switch actuating pin 84. The arrangement may be such that upon starting the machine cycle, the motor will operate in one direction to rotate the shaft 51 and, therefore, the lead screw 54, and the cam 63 in a forward direction to advance the tool T a predetermined distance through the work. At the end of the forward movement, the pin 82 is operable to actuate the switch mechanism 81 and effect reversal of the motor 78. Thereupon, the motor 78 is operated to drive the screw and cam assembly in a reverse direction to withdraw the tool T from the work. At the end of the return stroke, the second pin 84 is operable to stop the motor 78.

We claim as our invention:

1. A boring machine comprising, in combination, a main frame, a rotary spindle mounted on said frame in a fixed axial position and adapted to support the work to be bored, a table slidable on said frame longitudinally of said spindle, and a boring tool fixture mounted on said table for movement thereby toward and from said spindle, said tool fixture comprising a sub-base secured to said table, a base mounted on said sub-base for adjustment transversely of said spindle, and having longitudinally spaced bearings, a carrier slide mounted on said base for translation longitudinally of said spindle, an operating shaft rotatably journaled in said slide for translation therewith, and being slidably guided at opposite ends in said bearings, a lead nut fixed on said base, a lead screw on one end of said shaft and in threaded engagement with said nut, spring means acting between said nut and screw to take up backlash therebetween constantly in one direction, a tool holder mounted in said carrier slide for translation therewith and for movement therein transversely of said spindle, a rotary contour cam fixed on said shaft, a cam follower fixed on said holder for adjustment transversely of said spindle, spring means acting to maintain said follower in coacting engagement with said cam, reversible drive means for rotating said shaft in forward and reverse directions, a boring tool bar mounted on said holder and extending longitudinally of said spindle, and a laterally projecting tool on said bar.

2. A boring machine comprising, in combination, a main frame, a rotary work spindle mounted on said frame, a table slidable on said frame longitudinally of said spindle, and a boring tool fixture mounted on said table, said tool fixture comprising a sub-base secured to said table, a base mounted on said sub-base for adjustment transversely of said spindle, and having longitudinally spaced bearings, a carrier slide mounted on said base for translation longitudinally of said spindle, an operating shaft rotatably journaled in said slide for translation therewith, and being slidably guided at opposite ends in said bearings, a lead nut fixed on said base, a lead screw on one end of said shaft and in threaded engagement with said nut, a tool holder mounted in said carrier slide for translation therewith and for relative movement transversely of said spindle, a rotary contour cam fixed on said shaft, a cam follower fixed on said holder, spring means acting to maintain said follower in coacting engagement with said cam, reversible drive means for rotating said shaft in forward and reverse directions, and a boring tool bar mounted on said holder and extending longitudinally of said spindle and adapted to support a laterally projecting tool.

3. A boring machine comprising, in combination, a main frame, a rotary work spindle mounted on said frame, and a boring tool fixture mounted on said frame, said tool fixture comprising a base having longitudinally spaced bearings, a carrier slide mounted on said base for translation longitudinally of said spindle, an operating shaft rotatably journaled in said slide for translation therewith, and being slidably guided in said bearings, a lead nut fixed on said base, a lead screw fixed on said shaft and in threaded engagement with said nut, a tool holder mounted in said carrier slide for translation therewith and for movement therein transversely of said spindle, a rotary contour cam fixed on said shaft, a cam follower fixed on said holder, spring means acting to maintain said follower in coacting engagement with said cam, reversible drive means for rotating said shaft in forward and reverse directions, a boring tool bar mounted on said holder and extending longitudinally of said spindle, and a laterally projecting tool on said bar.

4. A boring machine comprising, in combination, a main frame, a rotary work spindle mounted on said frame, and a boring tool fixture mounted on said frame, said tool fixture comprising a base, a carrier slide mounted on said base for translation longitudinally of said spindle, a lead nut element, a lead screw element in threaded engagement with said nut element, one of said elements being secured to said base and the other of said elements being secured to said slide for translation therewith, one of said elements being fixed against rotation and the other of said elements being rotatable, a tool holder mounted in said carrier slide for translation therewith and for movement therein transversely of said spindle, a rotary contour cam fixed on the rotatable one of said elements, a cam follower fixed on said holder and in coacting engagement with said cam, reversible drive means for rotating said rotatable element in forward and reverse directions, a boring tool bar mounted on said holder and extending longitudinally of said spindle, and a tool on said bar projecting laterally therefrom substantially in a direction longitudinally of said holder.

5. A boring tool fixture adapted to be mounted on the frame of a boring machine in operative relation to a rotary work spindle, said fixture comprising, in combination, a base, a carrier slide mounted on said base for longitudinal translation, a lead nut element, a lead screw element in threaded engagement with said nut element, one of said elements being secured to said base and the other of said elements being secured to said slide for translation therewith, one of said elements being fixed against rotation and the other of said elements being rotatable, a tool holder mounted in said carrier slide for longitudinal translation therewith and for lateral translation therein and projecting therefrom, a rotary contour cam fixed on the rotatable one of said elements, a cam follower fixed on said holder and in coacting engagement with said cam, reversible drive means for rotating said rotatable element, a boring bar mounted on the outer end of said holder and extending parallel to the longitudinal translation of said carrier, and a boring tool mounted on said bar and projecting laterally therefrom substantially in the plane of longitudinal and transverse movements of said holder.

6. A boring machine comprising in combination, a frame, a rotary work spindle mounted on said frame, a table slidable on said frame longitudinally of said spindle, a carrier slide mounted on said table for traverse movements therewith longitudinally of said spindle, a tool holder mounted on said carrier slide for positioning movements transversely of said spindle, a tool bar mounted in said holder for longitudinal and rotary adjustments and extending longitudinally of said spindle, a single point tool mounted on and projecting laterally from said bar, an operating shaft rotatably journaled in said carrier slide against relative longitudinal movement, means for reversibly driving said shaft, a fixed lead nut on said table, a lead screw on said shaft in threaded engagement with said nut for reversibly traversing said carrier slide upon reverse rotation of said shaft, a rotary peripheral-face contour cam fixed on said shaft, a cam follower on said holder and engaging the periphery of said cam, said follower having a limited oscillatory movement in the plane of said cam, and means for maintaining said follower in engagement with the cam face.

7. A boring machine comprising, in combination, a frame, a rotary work spindle mounted on said frame, a table slidable on said frame longitudinally of said spindle, a carrier slide mounted on said table for traverse movements therewith longitudinally of said spindle, a tool holder mounted on said carrier slide for positioning movements transversely of said spindle, a tool bar mounted in said holder and extending longitudinally of said spindle, a single point tool mounted on and projecting laterally from said bar in a direction generally longitudinally of said holder, an operating shaft journaled in said carrier slide against relative longitudinal movement, means for reversibly driving said shaft, a fixed lead nut on said table, a lead screw on said shaft in threaded engagement with said nut for reversibly traversing said carrier slide upon reverse rotation of said shaft, a rotary peripheral-face contour cam fixed on said shaft, a cam follower on said holder and engaging the periphery of said shaft, and means for maintaining said follower in engagement with the cam face.

8. A boring machine comprising, in combination, a main frame, a rotary work spindle mounted on said frame, a tool fixture mounted on said frame, means for effecting relative adjustment between said spindle and said fixture longitudinally of the spindle axis, a tool holder mounted in said fixture for movement transversely of the spindle axis, a boring bar mounted in said holder and extending longitudinally of the spindle axis for supporting a laterally projecting boring tool, reversible power operated means for translating said holder in a direction longitudinally of the spindle axis in forward and return strokes, a rotary contour cam in said fixture operable in forward and reverse directions in positively timed relation to said last mentioned means, a cam follower secured to said holder and arranged for peripheral wiping engagement with said cam to determine the radial position of said tool progressively in the course of said translation, and spring means acting to maintain said follower in engagement with said cam, said follower being adjustable on said holder radially of said cam to vary the position of said tool in accordance with the size of the work to be bored, and having a lost motion connection with said holder peripherally of said cam adapted to be taken up by said wiping action in one direction or the other depending on the direction of rotation of said cam whereby to vary the radial position of said tool relative to said cam.

9. A boring machine comprising, in combination, a main frame, a rotary work spindle mounted on said frame, a tool fixture mounted on said frame, means for effecting relative adjustment between said spindle and said fixture longitudinally of the spindle axis, a tool holder mounted in said fixture for movement transversely of the spindle axis, a boring bar mounted in said holder and extending longitudinally of the spindle axis for supporting a laterally projecting boring tool, reversible power operated means for translating said holder in a direction longitudinally of the spindle axis in forward and return strokes, a rotary contour cam in said fixture operable in forward and reverse directions in positively timed relation to said last mentioned means, a cam follower secured to said holder and arranged for peripheral wiping engagement with said cam to determine the radial position of said tool progressively in the course of said translation, and spring means acting to maintain said follower in engagement with said cam, said follower having a lost motion connection with said holder peripherally of said cam adapted to be taken up by said wiping action in one direction or the other depending on the direction of rotation of said cam whereby to vary the radial position of said tool relative to said cam.

HAROLD N. SEYFERTH.
GILBERT STEWART.

REFERENCES CITED

The following references are of record in the file of this patent:

UNITED STATES PATENTS

| Number | Name | Date |
|---|---|---|
| 2,140,949 | Bickel | Dec. 20, 1938 |
| 1,677,131 | Cole et al. | July 17, 1928 |